United States Patent
Tsao et al.

(10) Patent No.: US 9,087,381 B2
(45) Date of Patent: Jul. 21, 2015

(54) METHOD AND APPARATUS FOR BUILDING SURFACE REPRESENTATIONS OF 3D OBJECTS FROM STEREO IMAGES

(71) Applicants: Thomas Tsao, Germantown, MD (US); Xuemei Cheng, Rockville, MD (US)

(72) Inventors: Thomas Tsao, Germantown, MD (US); Xuemei Cheng, Rockville, MD (US)

(*) Notice: Subject to any disclaimer, the term of this patent is extended or adjusted under 35 U.S.C. 154(b) by 99 days.

(21) Appl. No.: 14/078,751

(22) Filed: Nov. 13, 2013

(65) Prior Publication Data
US 2015/0131897 A1 May 14, 2015

(51) Int. Cl.
*G06K 9/00* (2006.01)
*G06T 7/00* (2006.01)

(52) U.S. Cl.
CPC .......... *G06T 7/0075* (2013.01); *G06K 9/00718* (2013.01); *G06T 7/0067* (2013.01); *G06T 7/0085* (2013.01); *G06T 7/0097* (2013.01); *G06K 9/00* (2013.01); *G06T 2207/10021* (2013.01); *G06T 2207/20112* (2013.01)

(58) Field of Classification Search
CPC ......... G06T 15/04; G06T 13/40; G06T 15/00; G06T 7/0022; G06T 2207/20016; G06T 17/30; G06T 19/20; G06T 2210/12; G06T 7/2066; G06T 17/20; G06T 2207/20072; G06T 7/0067; A63F 2300/66; G06Q 30/02; G11B 20/00086; G06F 17/3087; G06K 9/00523; G06K 9/00624; G06K 9/00744; G06K 9/3241; G06K 2209/09; G06K 9/00288; G06K 9/4619; G06K 9/00375; G06N 3/0635
USPC ................. 382/103, 154, 156, 157, 158, 291; 345/419, 421; 395/21, 22, 24, 107
See application file for complete search history.

(56) References Cited

U.S. PATENT DOCUMENTS

| | | | | |
|---|---|---|---|---|
| 5,487,172 A * | 1/1996 | Hyatt | | 712/32 |
| 5,535,302 A * | 7/1996 | Tsao | | 706/20 |
| 5,911,035 A * | 6/1999 | Tsao | | 706/16 |
| 6,621,921 B1 * | 9/2003 | Matsugu et al. | | 382/154 |
| 6,777,684 B1 * | 8/2004 | Volkov et al. | | 250/341.1 |
| 6,858,826 B2 * | 2/2005 | Mueller et al. | | 250/208.1 |
| 2004/0085311 A1 * | 5/2004 | Lee et al. | | 345/419 |
| 2004/0151365 A1 * | 8/2004 | An Chang et al. | | 382/154 |
| 2005/0128197 A1 * | 6/2005 | Thrun et al. | | 345/421 |
| 2005/0163365 A1 * | 7/2005 | Barbour | | 382/154 |
| 2007/0274574 A1 * | 11/2007 | Boult et al. | | 382/119 |
| 2008/0212838 A1 * | 9/2008 | Frigerio | | 382/107 |
| 2011/0134225 A1 * | 6/2011 | Saint-Pierre et al. | | 348/47 |
| 2011/0141306 A1 * | 6/2011 | Nakano et al. | | 348/222.1 |
| 2013/0071012 A1 * | 3/2013 | Leichsenring et al. | | 382/154 |
| 2014/0211989 A1 * | 7/2014 | Ding et al. | | 382/103 |

* cited by examiner

*Primary Examiner* — Vu Le
*Assistant Examiner* — Aklilu Woldemariam

(57) ABSTRACT

A method and apparatus for extracting surface representation from images and video data for segmenting image plane according to the surface connectivity, and identifying areas of images taken by a moving camera according to the object surfaces wherefrom the areas of images are taken, are disclosed. The invention discloses a method and apparatus comprising a plurality of processing modules for extracting from images in a video sequence the occluding contours delineating images into regions in accordance with the spatial connectivity of the correspondent visible surfaces, and diffeomorphism relations between areas of images taken from different perspective centers for identifying image areas of different frames as of the surface of same object, and specifying the fold contours of the surfaces that owns the contour, and thus producing the surface representations from video images taken from persistent objects by a moving camera.

8 Claims, 6 Drawing Sheets

METHOD AND APPARATUS FOR BUILDING SURFACE REPRESENTATIONS OF 3D OBJECTS FROM STEREO IMAGES

REFERENCES

1. Tsao, T., U.S. Pat. No. 5,535,302, "Method and apparatus for determining image affine flow using artificial neural system with simple cells and lie germs".
2. Tsao, T., U.S. Pat. No. 5,911,035, "Method and apparatus for determining binocular affine disparity and affine invariant distance between two image patterns".
3. Tsao, T. and Tsao D., "Lie group model neuromorphic geometric engine for real-time terrain reconstruction from stereoscopic aerial photos", *Proceedings of SPIE—Volume* 3077 Applications and Science of Artificial Neural Networks III, 1997, on pp. 535-544
4. Whitney, H. On Singularities of Mappings of Euclidean Spaces. I. Mappings of the Plane into Plane, in: *The Annals of Mathematics*, $2^{nd}$ Ser., Vol. 62, No. 3. pp 374-410, 1955
5. Gibson, J. J, "The Ecological Approach to Visual Perception", published in 1986, ISBN 0-89859-958-X.

BACKGROUND OF THE INVENTION

1. Field of the Invention

The invention relates to video data processing systems and methods and more particularly to systems and methods of using computers for segmenting image plane according to the surface connectivity, and identifying areas of images taken by a moving camera according to the object surfaces wherefrom the areas of images are taken. The image segmentations and object based identifications thus constitute a topological surface representation of objects. The invention discloses a method and apparatus comprising a plurality of processing modules for extracting from images in a video sequence the occluding contours delineating images into regions in accordance with the spatial connectivity of the correspondent visible surfaces, and diffeomorphism relations between areas of images taken from different perspective centers for identifying image areas of different frames as of the surface of same object, and specifying the fold contours of the surfaces that owns the contour, and thus producing the surface representations from video images taken from persistent objects by a moving camera.

Many concepts and terminologies used in this invention description can be found in Gibson's book "The Ecological Approach to Visual Perception".

2. Description of the Related Art

Techniques of using digital computers for extracting visual information from video data including automatic object and human detection, recognition and tracking, object and human motion pattern learning, purposeful motion detection and classification, anomaly detection and classification, are developed for different purposes. These are related arts. At the core of the application systems are the techniques of image segmentation and object tracking, the necessary steps that transform the sensory data streams composed of tremendous quantity of transient pixels into a much smaller number of stable discrete units upon them the object recognition, object (human) motion pattern recognition, and more complex spatial-temporal event analysis may further be performed. The intermediate representation established by ways of image segmentation and image tracking on one hand relates to sensory data, on the other hand it relates to higher level symbolic conceptual representation: objects, things, facts, and events.

Video image segmentation and object tracking techniques were studied in various university research institutes as well as commercial sector R&D branches. Numerous research articles and books on object segmentation and tracking were published. Current art of computational vision uses object appearance information such as pixel motion, optical flow, brightness, color, and texture to delineate image into discrete areas, and tracks them in video sequences. These methods are generally not referenced to surface representation. They are addressed in terms of segmentation of image patterns and tracking of image patterns.

The 3D reconstructions of visible scene were studied in computer vision community and algorithms and computer programs were developed and resulted from such studies. The purpose of these works was to specify (construct) depth maps of visible surfaces from binocular stereopsis, particularly through measurement of disparities of correspondent pixels in overlapped regions of a stereo pair of images. These methods were not aimed to extract surface topological information, particularly those for specifying the scopes of each individual visible surface of one object in a scene, and those for specifying spatial separations between them and the manner these visible surfaces spatially extended into occluded, and those for identifying visible surfaces seen from different perspectives via their partial overlaps in the 3D space.

Scientific data from vision research in recent years have shown that human vision system builds surface representation of objects at an early stage of visual perception. It is through the surface representation human vision system is able to have the general percepts of individual identifiable discrete persistent objects. Surfaces are first of all the topological objects. The existence of surface representation indicates human vision system is able to extract topological information of the physical constructions of its environment: ground, objects, other humans and animals, etc. In past decade, neurobiological data indicated that occluding contours are extracted in monkey's V2 area. Two sides of an occluding contour are images of spatially separated local surfaces. In monkey's vision system, the information of spatial continuation of a visible surface passing an occluding contour is coded in the form of the border ownership of the contour. Images of a surface of an object taken from different perspectives are related by perspective mappings. Patches of different images taken with a moving video camera are related by a perspective mapping representing a same object surface. The perspective mappings between images and occluding contours thus constitute the surface representation of the environment.

U.S. Pat. Nos. 5,535,302 and 5,911,035 and the article by Tsao, T. and Tsao D. "Lie group model neuromorphic geometric engine for real-time terrain reconstruction from stereoscopic aerial photos," published in: Proceedings of SPIE—Volume 3077 Applications and Science of Artificial Neural Networks III, 1997, on pp. 535-544, described methods and apparatus for extracting image affine transformation, the first order Taylor approximation of perspective mappings, presents a technique for computing approximations of perspectives mappings of image patches taken from different perspectives.

Various image intensity edge detection algorithms and codes published in various computer vision journals and books and other sources are open to public.

SUMMARY OF THE INVENTION

Current art of video information extraction systems relate objects and events directly to images and features, and motions extracted from images. These systems do not provide a surface representation as the intermediate step towards object and event recognition. This invention concerns a method and apparatus for building a representation of persistent surfaces of objects and the ground from the images taken by video cameras. From a well-known mathematical theorem of Whitney, H. (On Singularities of Mappings of Euclidean Spaces. I. Mappings of the Plane into Plane, in: *The Annals of Mathematics*, $2^{nd}$ Ser., Vol. 62, No. 3. pp 374-410, 1955), we know that almost all points in the images taken from the environment are surrounded by some neighborhood wherein points are correspondent to points on the surface in a one-to-one continuous manner unless the point is on some occluding contour, namely it is the image of a fold singularity or a cusp singularity of some object or ground surface. The perspective image of a singular point on the surface is called a critical value of the perspective projection. The perspective projection of a surface patch containing no critical point to its image is a diffeomorphism. By moving the perspective center, the same surface patch can be projected to multiple images related to each other by perspective mappings. A perspective mapping is also termed a stereo diffeomorphism. An occluding contour is the image of a fold contour of a surface under some perspective projection. The folded surface is termed the owner of the occluding contour. The topological study on the surfaces and their perspective images reveals that by detecting the occluding contours in a perspective image, a vision system may segment an image into different components each corresponding to a connected visible surface. These connected visible surfaces are spatially separated to each other. Furthermore, surface representations in different perspectives are identified as of the same object if they are partially related with some perspective mappings, or there is a chain of intermediate images that the surface representations are consecutively partially related with some perspective mappings. The class of chain-connected surface representations is termed a CC-equivalence class of surface representations.

Accordingly, it is an object of this invention to provide a method and apparatus for autonomously extracting information from images and building surface representations directly on the images for 3D objects and the background.

It is another object of this invention to provide a method and apparatus for autonomously labeling components of images as representations of object surfaces.

It is another object of this invention to provide a method and apparatus for autonomously extracting occluding contours in the images as borders of image components.

It is another object of this invention to provide a method and apparatus automatically extracting intensity edges from images and integrating extracted intensity edges into piecewise smooth contours.

It is another object of this invention to provide a method and apparatus automatically detecting critical points of said piecewise smooth contours and measuring tangent directions at each non-critical point of said piecewise smooth contours.

It is another object of this invention to provide a method and apparatus automatically segmenting said piecewise smooth contours into regular segments with said detected critical points.

It is another object of this invention to provide a method and an apparatus automatically discriminating occluding contours from said extracted regular segments and determining their owner's side.

It is another object of this invention to provide a method and an apparatus for automatically integrating said regular segments into integrated smooth contours.

It is another object of this invention to provide a method and apparatus for autonomously extracting end-stop points of detected occluding contours.

It is another object of this invention to provide a method and apparatus for autonomously finding associative pairs of end-stop points and linking the end-stop points accordingly.

It is yet another objective of this invention to provide a method and apparatus to automatically linking an end-stop to a point on an integrated smooth occluding contour.

It is yet another objective of this invention to provide a method and apparatus for autonomously segmenting each video image into a plurality of connected regions each bounded by occluding contours.

It is another objective of this invention to provide a method and apparatus for autonomously identifying areas of different images are of same objects.

It is yet another objective of this invention to provide a method and apparatus for autonomously assigning each said connected image regions symbolic identifications.

It is yet another objective of this invention to provide a method and apparatus for autonomously associating symbolic representations of connected image regions to symbolic representations of objects.

It is yet another objective of this invention to provide a method and apparatus for autonomously maintaining consistent symbolic representations for image regions in consecutive frames of a video image sequence of same objects.

It is another objective of this invention to provide a method and apparatus for autonomously identifying for a regular segment in a first image a correspondent regular segment in a second image.

It is another objective of this invention to further provide a method and apparatus for autonomously finding for a point on a regular segment in said first image a correspondent point on the correspondent regular segment in said second image.

It is yet another objective of this invention to further provide a method and apparatus for autonomously selecting domains centered at points along a regular segment in an image and dividing said domain into two sided-domains with a part of said regular segment serving their borders.

It is another objective of this invention to provide a method and apparatus for autonomously deciding whether or not a domain in a first image and a domain in a second image are related by a stereo diffeomorphism.

It is another objective of this invention to provide a method and apparatus for autonomously discriminating contours associated with sharp turnings of orientations of surfaces from said regular segments in an image.

BRIEF DESCRIPTION OF THE DRAWINGS

Exemplary embodiments of the invention are shown in the drawings and will be explained in detail in the description that follows.

DESCRIPTION OF THE PREFERRED EMBODIMENT

This invention is a computer vision system aimed at building a surface topological representation of a 3D scene from a data set of stereoscopic images. Said stereoscopic image data set means each first image in the data set has at least one stereoscopic partner, i.e., a second image taken from a different point of observation nearby the observation point wherefrom the first image was taken and having substantial overlapping areas with the first image in their imaged visible surfaces. Said surface topological representation of a 3D scene is a set of data specifying the spatial connectedness and separating of imaged visible surfaces of the 3D scene. For a given image, said data effectively divides the image plane into separated connected regions according to spatial separation of the surfaces imaged and the data specifies the boundary contours of said connected regions and the sides of the owners of the boundary contours. The surface topological representation primarily taking a so-called retinotopic form that the image regions and their boundary contours, the owner sides of the boundary contours, the end and intersection points of these contours are all presented in a map over the image plane and topologically arranged consistent to the image, is called an ad hoc surface representation associated with said image. Said surface topological representations of a 3D scene further include a set of symbolic data specifying the topological identifications of the image regions maintained across images taken from different point of views. Said topological identifications are judged in accordance with chain connectedness of the visible surfaces of 3D scene represented by said image regions.

Figure 1:
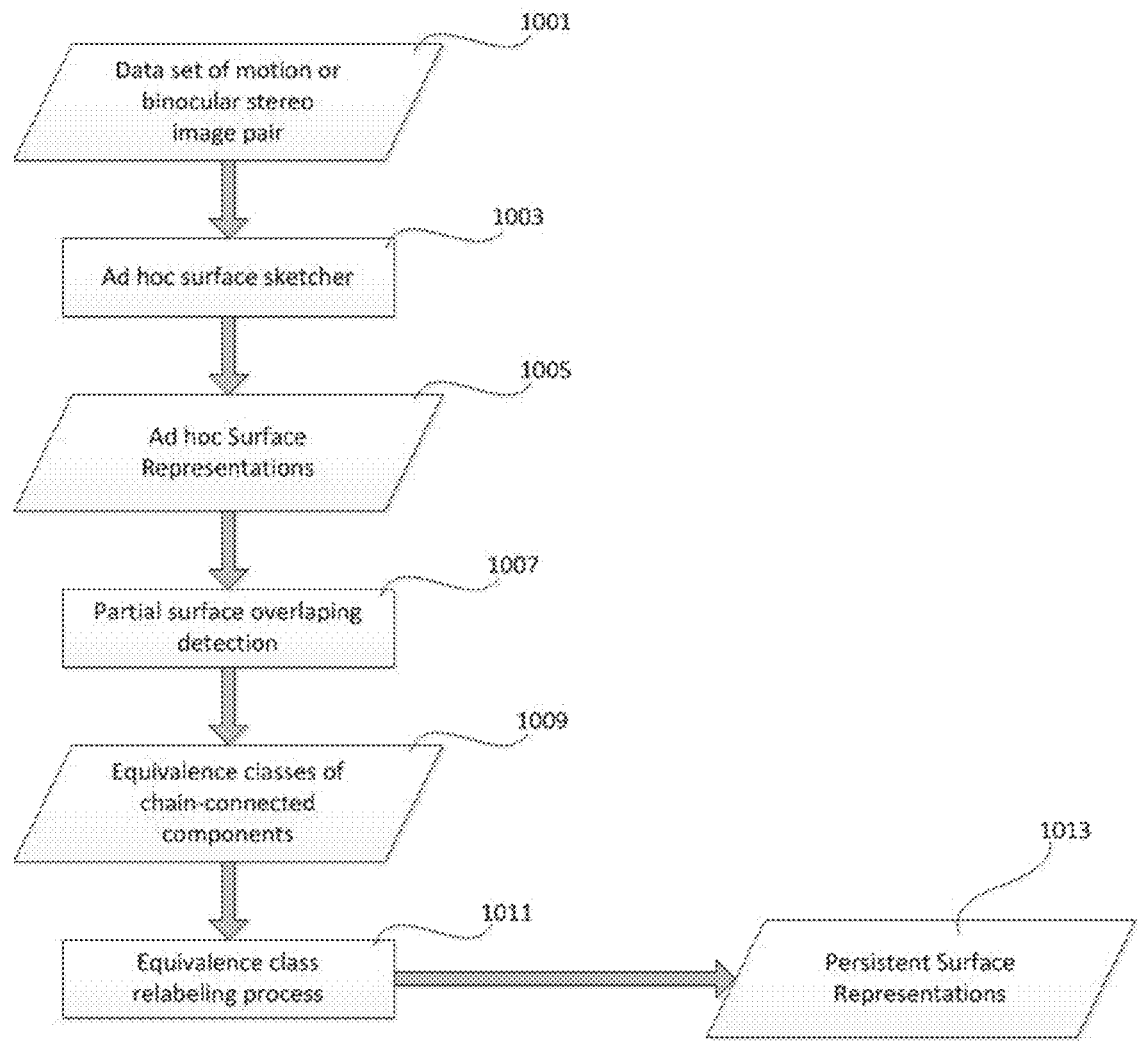
FIG. 1 is a schematic diagram of a computational vision system for extraction of persistent surface representation from a plurality of stereo images.

In accordance with the present invention and with reference to FIG. 1, a global stereoscopic surface topology analyzer comprises an input channel for receiving data set of stereoscopic image pairs 1001 and feeding to an ad hoc surface sketcher 1003 for analyzing from each stereoscopic image pair the topology of visible surfaces that appear in said image pairs. The visible surfaces that appear in both images in a stereoscopic image pair are termed the stereoscopically visible surfaces; and the surface parts that appear in only one of the stereoscopic image pair are termed the monocular visible surfaces. As the process result of the ad hoc surface sketcher, the ad hoc surface representations 1005 of the 3D scene, consists of integrated occluding contours each with assigned owner side, and the image regions segmented by these integrated occluding contours, and the intersection points and end-stop points of these occluding contours (collectively called topological objects). The topological objects extracted by said ad hoc surface sketcher have a map representation on the image plane along with the map representation is labeled with designated symbols. The map representation with symbolic labeling constitutes an ad hoc surface representation. Said global surface topology analyzer further comprises a partial surface overlapping detection 1007 for receiving ad hoc surface representations 1005 and generating CC-equivalence classes 1009 according to partial overlapping relations among image regions in said ad hoc representations; an equivalence class relabeling process 1011 for receiving CC-equivalence classes and relabeling regions in ad hoc representations one symbol for a class, and producing a representation of persistent surfaces 1013 with labeled CC-equivalence classes.

Figure 2:
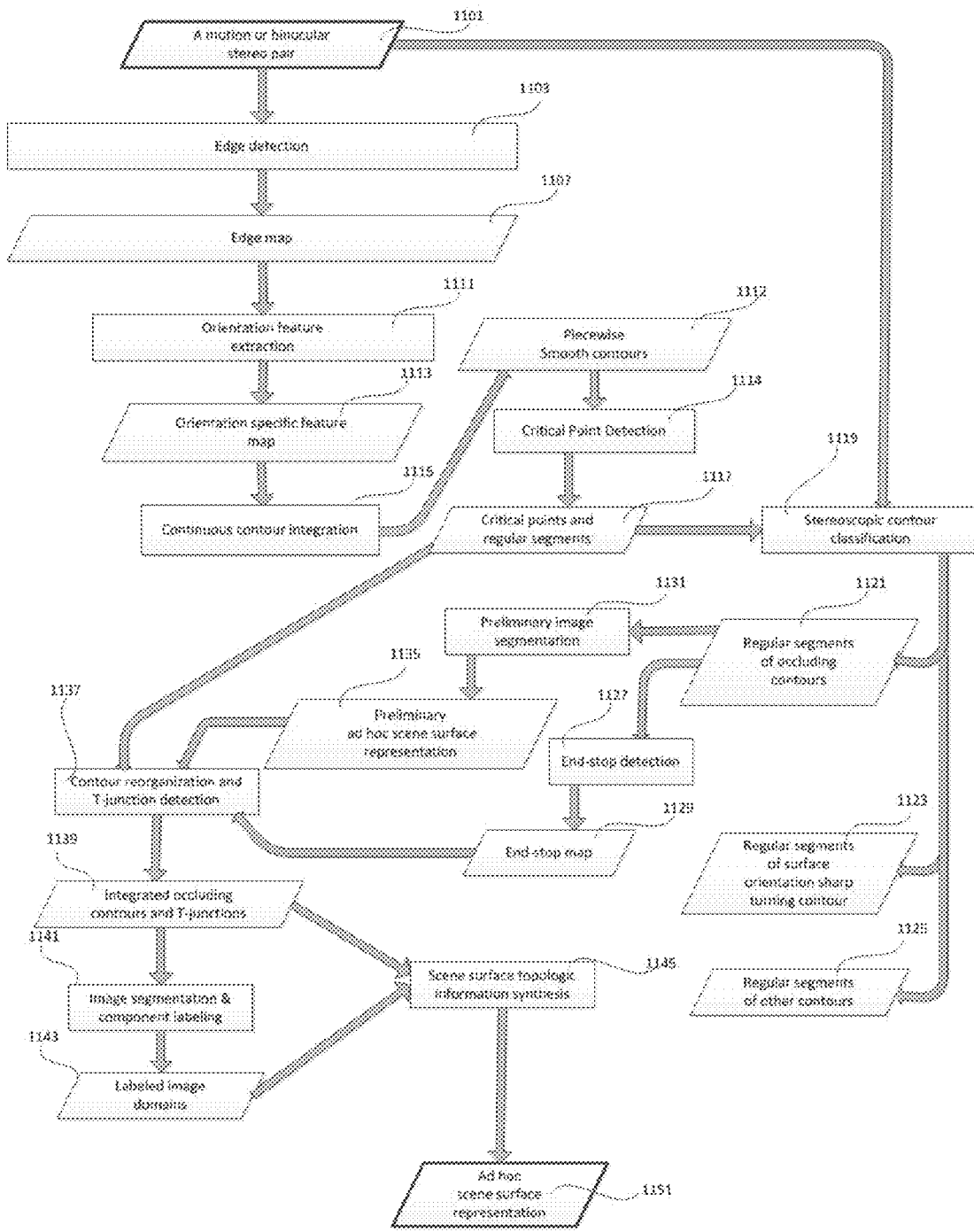
FIG. 2 is a schematic diagram of an ad hoc surface sketcher for segmenting a stereo pair of images according to the spatial connectivity of visible surfaces.

In accordance with the present invention and with reference to FIG. 1 and FIG. 2, said ad hoc surface sketcher 1003 further comprises an edge detection 1103 for receiving a pair of stereo pair of images 1101 and generating an stereo pair of edge maps 1107; an orientation feature extraction process 1111 for receiving edge map 1107 of each image in said stereo pair and generating an orientation specific feature map 1113 for each said image in said stereo pair; a continuous contour integration process 1115 for receiving said orientation specific feature map 1113 and generating piecewise smooth contours 1112; a critical point detection process 1114 for receiving piecewise smooth contours 1112 and generating a map of critical points and regular segments 1117; a stereoscopic contour classification 1119 for receiving said stereoscopic pair of images 1101 and stereo pair of maps 1117 of critical points and regular segments and classifying regular segments into three mutual exclusive classes (1121, 1123, and 1125): class of regular segments of occluding contours 1121, class of regular segments of contours of sharp turning of surface orientations 1123, and class of regular segments of other smooth contours 1125; a preliminary image segmentation process 1131 for receiving the stereo pair of maps of occluding contours 1121 and generating a stereo pair of preliminary ad hoc scene surface representation 1135; an end-stop detection 1127 for receiving a stereo pair of maps of regular segments of occluding contours 1121 and generating a stereo pair of maps of end-stops 1129; a contour reorganization and T-junction detection process 1137 for receiving a stereo pair of maps of critical points and regular segments 1117, a stereo pair of maps of end-stop points 1129, a stereo pair of preliminary ad hoc scene surface representations 1135 and generating a stereo pair of maps of integrated occluding contours and T-junctions 1139; an image segmentation and component labeling process 1141 for receiving a stereo pair of maps of integrated occluding contours and T-junctions 1139 and generating a stereo pair of maps of labeled image domains 1143; a scene surface topologic information synthesis process 1145 for receiving a pair of maps of integrated occluding contours and T-junctions 1139, a stereo pair of maps of labeled image domains 1143 and generating a stereo pair of ad hoc scene surface representations 1151.

Figure 3:
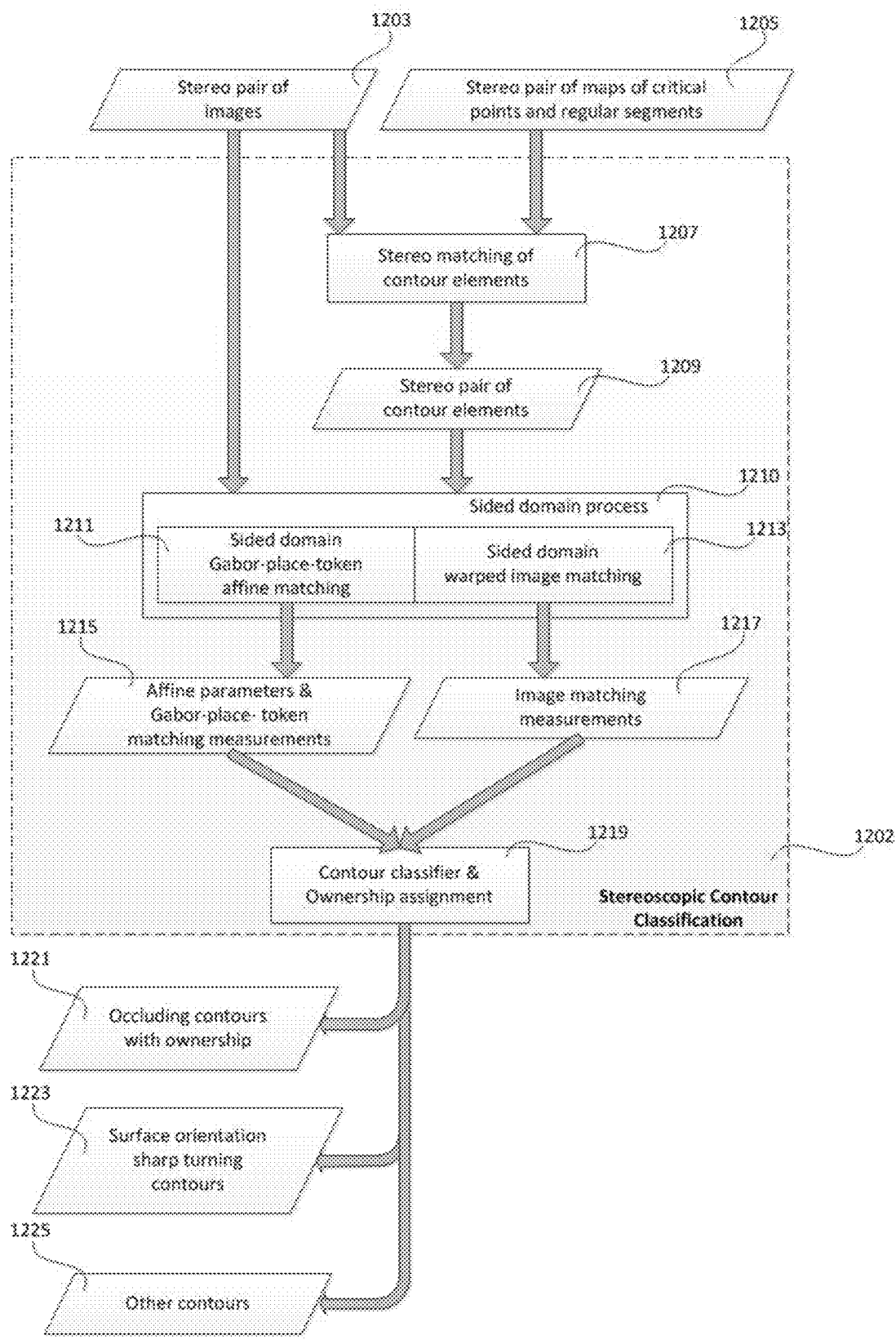
FIG. 3 is a schematic diagram of a contour classification module for classifying smooth contours into classes of occluding contours, contours of abrupt change of surface orientations, and other smooth contours.

In accordance with the present invention and with reference to FIG. 2 and FIG. 3, said stereoscopic contour classification process (1119 in FIG. 2 and 1202 in FIG. 3) further comprises a stereo matching process of contour elements 1207 for receiving stereo pair of images 1203 and stereo pair of maps of critical points and regular segments 1205 and generating stereo pair of contour elements 1209; a sided domain process 1210 comprising a sided domain Gabor place token affine matching process 1211 and a sided domain warped image matching process 1213 for receiving matched stereo pairs of contour elements and stereo pair of images and generating affine parameters and Gabor place-token matching measurements 1215 and stereo image matching measurements 1217; a contour classifier and owner assigner 1219 for receiving sided stereo affine parameters and Gabor place-token matching measurements 1215 and image matching measurements 1217 and generating a stereo pair of maps of occluding contours with owner side assigned 1221, surface orientation sharp turning contours 1223, and other contours 1225.

Figure 4:
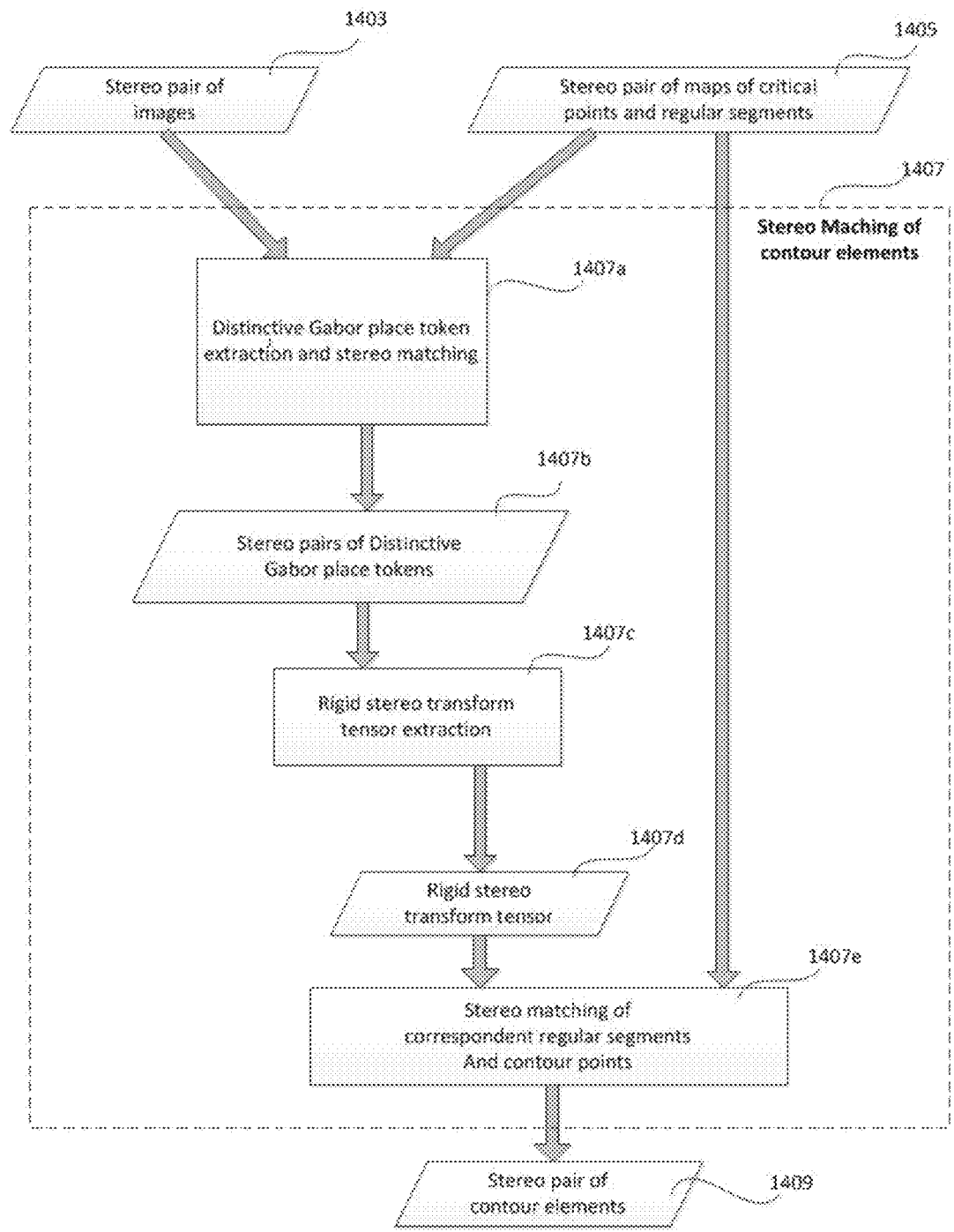
FIG. 4 is a schematic diagram of a processing module of stereo contour elements matching for matching regular segments and the points on the matched pair in between two images in a stereo pair.

In accordance with the present invention and with reference to FIG. 4, said stereo matching of contour elements 1407*a* further comprising distinctive Gabor place-token extraction and stereo matching process for receiving stereo pair of images 1403 and stereo pair of maps of critical points and regular segments 1405 and generating stereo pairs of distinctive Gabor place-tokens 1407*b*; a rigid stereo transform tensor transform tensor extraction process 1407*c* for receiving stereo pairs of distinctive Gabor place-tokens and generating rigid stereo transform tensor 1407*d*; a process of stereo matching of correspondent regular segments and contour points for receiving rigid stereo transform tensor and stereo pair of maps of critical points and regular segments and generating stereo pairs of contour elements 1409.

Figure 5:
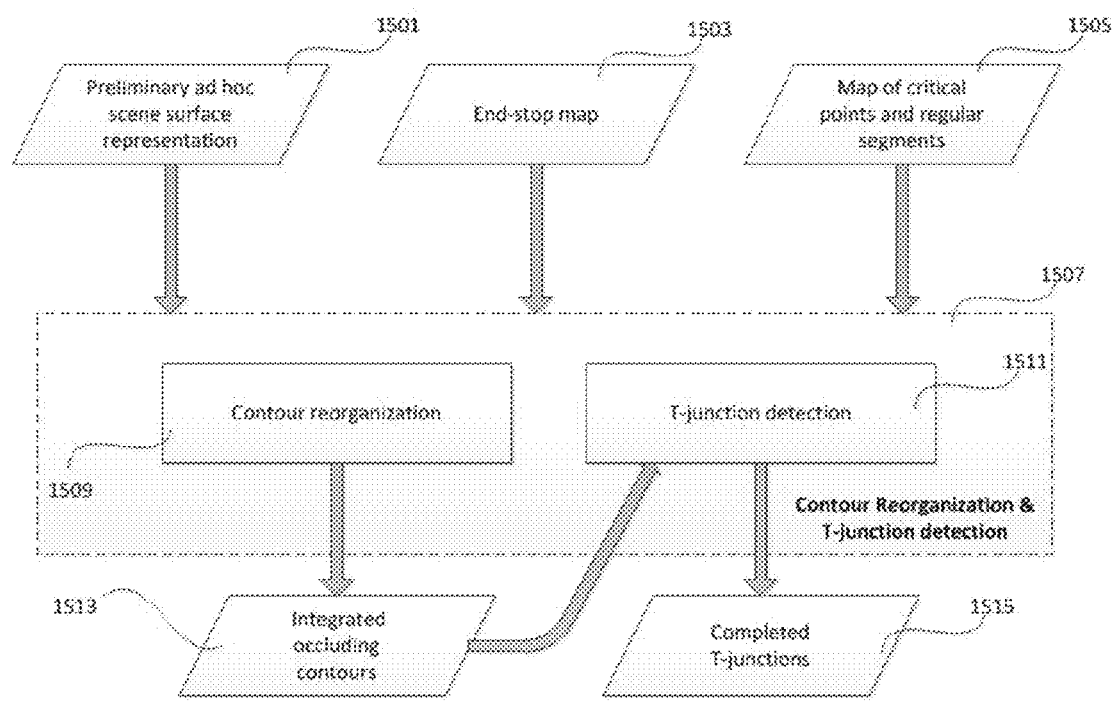
FIG. 5 is a schematic diagram of a processing module of contour reorganization & T-junction detection for integrating regular segments into integrated occluding contours and completed T-junctions.

Referring to FIG. 5, a schematic diagram illustrates a processing module of contour reorganization & T-junction detection for integrating regular segments into integrated occluding contours and completed T-junctions. A said end-stop map 1503, a preliminary ad hoc scene surface representation 1501 and a map 1505 of critical points and regular segments are input to a module 1507 of contour reorganization and T-junction detection; The module 1507 further comprises a module 1509 of contour reorganization and a module 1511 of T-junction detection. A plurality of integrated occluding contours 1513 are generated from the module 1509 of contour reorganization, and a plurality of completed T-junctions 1515 are generated from the module 1511 of T-junction detection, which takes, as part of its input, the result 1513 of module 1509 of contour reorganization.

Figure 6:
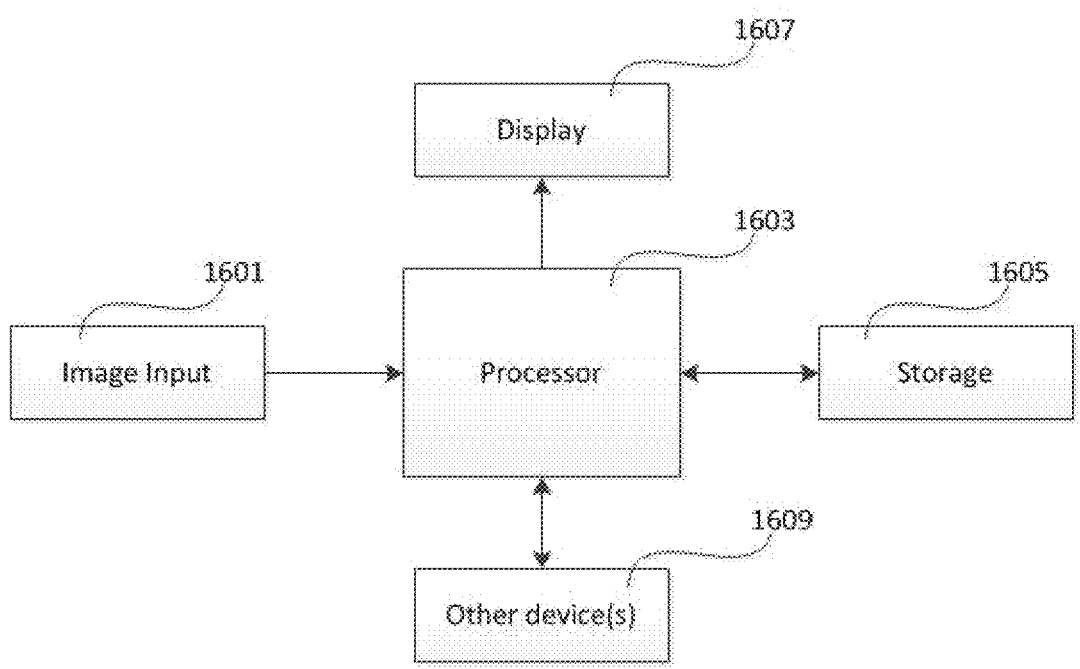
FIG. 6 is a schematic diagram of a processor circuit processing images or videos to produce surface representations of said images.

Referring to FIG. 6, a schematic diagram of a processor circuit or a computer system for processing images or videos utilizing the above disclosed methods is illustrated as an exemplary embodiment. Images or videos are input from video device 1601 such as cameras or from computer internal or external storage 1605, or from other devices 1609 through computer I/O into computer processor 1603 for producing surface representation according to the above disclosed methods; the final results or intermediate results of the said surface representation production process can be sent to display 1607, or be exchanged or sent to computer internal or external storage 1605, or be sent to other devices 1609 for other purpose such as directing a robot for further vision recognition.

Still referring to FIG. 6, as one of such preferred embodiment, a camera with embedded processor produces surface representation information on the fly, and then embeds whole or part of the said surface representation information as part of image or video media, such as digital image or video files.

Although the present invention has been described with reference to a preferred embodiment, the invention is not limited to the details thereof, various modifications and substitutions will occur to those of ordinary skill in the art, and all such modifications and substitutions are intended to fall within the spirit and scope of the invention as defined in the appended claims.

What is claimed is:

1. A method for building representations of persistent surfaces of objects from a plurality of images of a rigid 3D scene taken from different points of observation at least comprising:
   (a) Ad hoc surface sketch step producing ad hoc surface representations each for an image in said plurality of stereo images from a plurality of stereo pairs of said images;
   (b) Surface partial overlapping detection step producing chain-connected equivalence classes of image regions within said images from a said plurality of images and said ad hoc representations derived from said plurality of images according to said ad hoc surface sketch step;
   (c) An image domain relabeling step producing a consistent labeling for each persistent surface as its symbolic representation from said ad hoc representations and said chain-connected equivalence classes, wherein said ad hoc surface sketch step substantially comprising:
      (a') An edge detection step producing stereo pairs of edge maps from said stereo pairs of images;
      (b') An orientation feature extraction step producing orientation feature maps from said edge maps;
      (c') An continuous contour integration step producing continuous contour maps from said orientation feature maps;
   (d) An critical point detection step producing maps of critical points and regular segments from said continuous contour maps;
   (e) An stereoscopic contour classification step producing maps of a first class of occluding contours, a second class of surface sharp turning contours, and a third class of smooth contours not of previous said first and second classes, from said stereo pairs of images and stereo pairs of said maps of critical points and regular segments;
   (f) A preliminary image segmentation step producing a representation of preliminary ad hoc scene surfaces from said maps of occluding contours;
   (g) An end-stop detection step producing a map of end-stops from a plurality of said occluding contours and said representation of preliminary ad hoc scene surfaces;
   (h) A contour reorganization and T-junction detection step producing a plurality of integrated occluding contours and completed T-junctions from a said end- stop map, a said preliminary ad hoc representation of scene surfaces, and a said stereo pair of maps of regular segments and critical points;
   (i) An image segmentation and labeling step producing a map of labeled image domains from a plurality of said integrated occluding contours and a plurality of said completed T-junctions;
   (j) A scene surface topology synthesis step producing an ad hoc scene surface representation from a plurality of said integrated occluding contours and completed T-junctions, and a map of labeled image domains.

2. A method according to claim 1 wherein said stereoscopic contour classification step further substantially comprising:
   (a) A stereo contour feature matching step producing matched stereo pairs of contour features from a said stereo pair of maps of regular segments and critical points and a said stereo pair of images;
   (b) a sided-domain process step further consisting of a sided-domain Gabor place-token matching step and a sided-domain warped image matching step, and producing sided affine parameters, sided Gabor place-token matching measurements and sided-domain warped image matching measurements from a said stereo pairs of images, a said matched stereo pair of contour features, and a said stereo pair of maps of regular segments critical points;
   (c) a contour classification and ownership assignment step producing a first class of a plurality of occluding contours with assigned owner sides, a second class of a plurality of surface orientation sharp turning contours with assigned convexity or concavity, and a third class of a plurality of other contours not included in said first and said second classes from said sided affine parameters, said sided Gabor place-token matching measurements, and said sided-domain warped image matching measurements.

3. A method according to claim 1, wherein said contour reorganization and T-junction detection step further substantially comprising:
   (a) a contour reorganization step producing a plurality of integrated occluding contours from a said preliminary of ad hoc scene surface topology, a said plurality of end-stops, a said map of critical points and regular segments;
   (b) a T-junction detection step producing a plurality of completed T-junctions from a said preliminary of ad hoc scene surface topology, a said plurality of end-stops and a said plurality of integrated occluding contours.

4. A method according to claim 2 wherein said stereo contour feature matching step further substantially comprising:
   (a) a distinctive Gabor place token extraction and stereo matching step producing a plurality of said stereo pairs of distinctive Gabor place tokens from a plurality of said stereo pair of images and a said plurality of stereo pair of maps of critical points and regular segments;
   (b) a rigid stereo transform tensor extraction step producing a rigid stereo transform tensor from a plurality of said stereo pairs of distinctive Gabor place tokens;
   (c) a stereo matching of correspondent regular segments and contour points step producing a plurality of stereo pairs of contour elements from a said rigid stereo transform tensor and a plurality of said stereo pair of images and a plurality of stereo pair of maps of critical points and regular segments.

5. An apparatus for producing representations of persistent surfaces of objects from a plurality of images of a rigid 3D scene taken from different points of observation, the said apparatus at least comprising a processor circuit substantially configured to:
   (a) produce ad hoc surface representations each for an image in said plurality of stereo images;
   (b) produce chain-connected equivalence classes of image regions within said images from a said plurality of images and said ad hoc representations derived from said plurality of images;
   (c) produce a consistent labeling for each persistent surface as its symbolic representation from said ad hoc representations and said chain-connected equivalence classes, wherein in the process to produce said ad hoc surface representation, said processor circuit substantially configured to:
      (a') produce stereo pairs of edge maps from said stereo pairs of images;
      (b') produce orientation feature maps from said edge maps;
      (c') produce continuous contour maps from said orientation feature maps;
   (d) produce maps of critical points and regular segments from said continuous contour maps;
   (e) produce maps of first class of occluding contours, second class of surface sharp turning contours, and third class of smooth contours not of said first and said second classes, from said stereo pairs of images and stereo pairs of said maps of critical points and regular segments;
   (f) produce a representation of preliminary ad hoc scene surfaces from said maps of said first class of occluding contours;
   (g) produce a map of end stops from a plurality of said first class of occluding contours and said representation of preliminary ad hoc scene surfaces;
   (h) produce a plurality of integrated occluding contours and completed T-junctions from a said end-stop map, a said preliminary ad hoc representation of scene surfaces, and a said stereo pair of maps of regular segments and critical points;
   (i) produce a map of labeled image domains from a plurality of said integrated occluding contours and a plurality of said completed T-junctions;
   (j) produce an ad hoc scene surface representation from a plurality of said integrated occluding contours and completed T-junctions, and a map of labeled image domains.

6. An apparatus according to claim 5, wherein the process to produce said maps of a said first class of occluding contours, a said second class of surface sharp turning contours, and a said third class of smooth contours, said processor circuit substantially configured to:
   (a) produce matched stereo pairs of contour features from a said stereo pair of maps of regular segments and critical points and a said stereo pair of images;
   (b) produce sided affine parameters, sided Gabor place-token matching measurements and sided-domain warped image matching measurements from a said stereo pair of images, said matched stereo pairs of contour features, and a said stereo pair of maps of regular segments critical points;
   (c) produce a first class of a plurality of occluding contours with assigned owner sides, a second class of a plurality of surface orientation sharp turning contours with assigned convexity or concavity, and a third class of a plurality of other contours not included in said first and said second classes from said sided affine parameters, said sided Gabor place-token matching measurements, and said sided-domain warped image matching measurements.

7. An apparatus according to claim 5 wherein the process to produce a said plurality of integrated occluding contours and completed T-junctions, the said processor circuit substantially configured to:
   (a) produce a plurality of integrated occluding contours from a said preliminary of ad hoc scene surface topology, a said plurality of end-stops, a said map of critical points and regular segments;
   (b) produce a plurality of completed T-junctions from a said preliminary of ad hoc scene surface topology, a said plurality of end-stops and a said plurality of integrated occluding contours.

8. An apparatus according to claim 6 wherein the process to produce said matched stereo pairs of contour features, said processor circuit substantially configured to:
   (a) produce a plurality of said stereo pairs of distinctive Gabor place tokens from a plurality of said stereo pair of images and a said plurality of stereo pair of maps of critical point and regular segments;
   (b) produce a rigid stereo transform tensor from a plurality of said stereo pairs of distinctive Gabor place token;
   (c) produce a plurality of stereo pairs of contour from a said rigid stereo transform tensor and a plurality of said stereo pair of images and a plurality of said stereo pair of maps of critical point and regular segments.

\* \* \* \* \*